US012664057B2

(12) United States Patent
Pande et al.

(10) Patent No.: US 12,664,057 B2
(45) Date of Patent: Jun. 23, 2026

(54) GEOGRAPHICALLY DISPERSED BACKUP AND RECOVERY SYSTEM WITH DYNAMIC RESOURCE ALLOCATION AND LOAD BALANCING

(71) Applicant: Dell Products L.P., Round Rock, TX (US)

(72) Inventors: Pankaj Pande, Carlingford (AU); Mengze Liao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 18/647,546

(22) Filed: Apr. 26, 2024

(65) Prior Publication Data

US 2025/0335311 A1 Oct. 30, 2025

(51) Int. Cl.
*G06F 11/1446* (2026.01)
*G06F 9/48* (2006.01)

(52) U.S. Cl.
CPC ........ *G06F 11/1464* (2013.01); *G06F 9/4881* (2013.01)

(58) Field of Classification Search
CPC .......................... G06F 11/1464; G06F 9/4881
USPC ........................................................ 711/162
See application file for complete search history.

(56) References Cited

U.S. PATENT DOCUMENTS

| | | | | |
|---|---|---|---|---|
| 9,690,670 | B1 * | 6/2017 | Paulzagade | ......... G06F 11/1464 |
| 2023/0205647 | A1 * | 6/2023 | Sharma | ............... G06F 11/2025 |
| | | | | 714/15 |
| 2023/0315586 | A1 * | 10/2023 | Desai | .................. G06F 11/3409 |
| | | | | 711/162 |
| 2024/0202078 | A1 * | 6/2024 | Ur Rahman | ........... G06N 20/00 |

* cited by examiner

*Primary Examiner* — Jared I Rutz
*Assistant Examiner* — Wei Ma
(74) *Attorney, Agent, or Firm* — Chamberlain, Hrdlicka, White, Williams & Aughtry; Aly Z. Dossa

(57) ABSTRACT

A method for managing data protection includes monitoring, by a data protection service, data protection requests issued by a set of client devices to obtain telemetry data, wherein the set of client devices are associated with a geographic location, performing a resource analysis on the telemetry data to determine a centralized backup system (CBS) instance allocation for a CBS instance in the geographic location, making a determination, based on the resource analysis, that the CBS instance is to be instantiated in the geographic location, based on the determination, deploying the CBS instance in a production environment located in the geographic location, and initiating a replication of backup data from a CBS to the CBS instance.

20 Claims, 9 Drawing Sheets

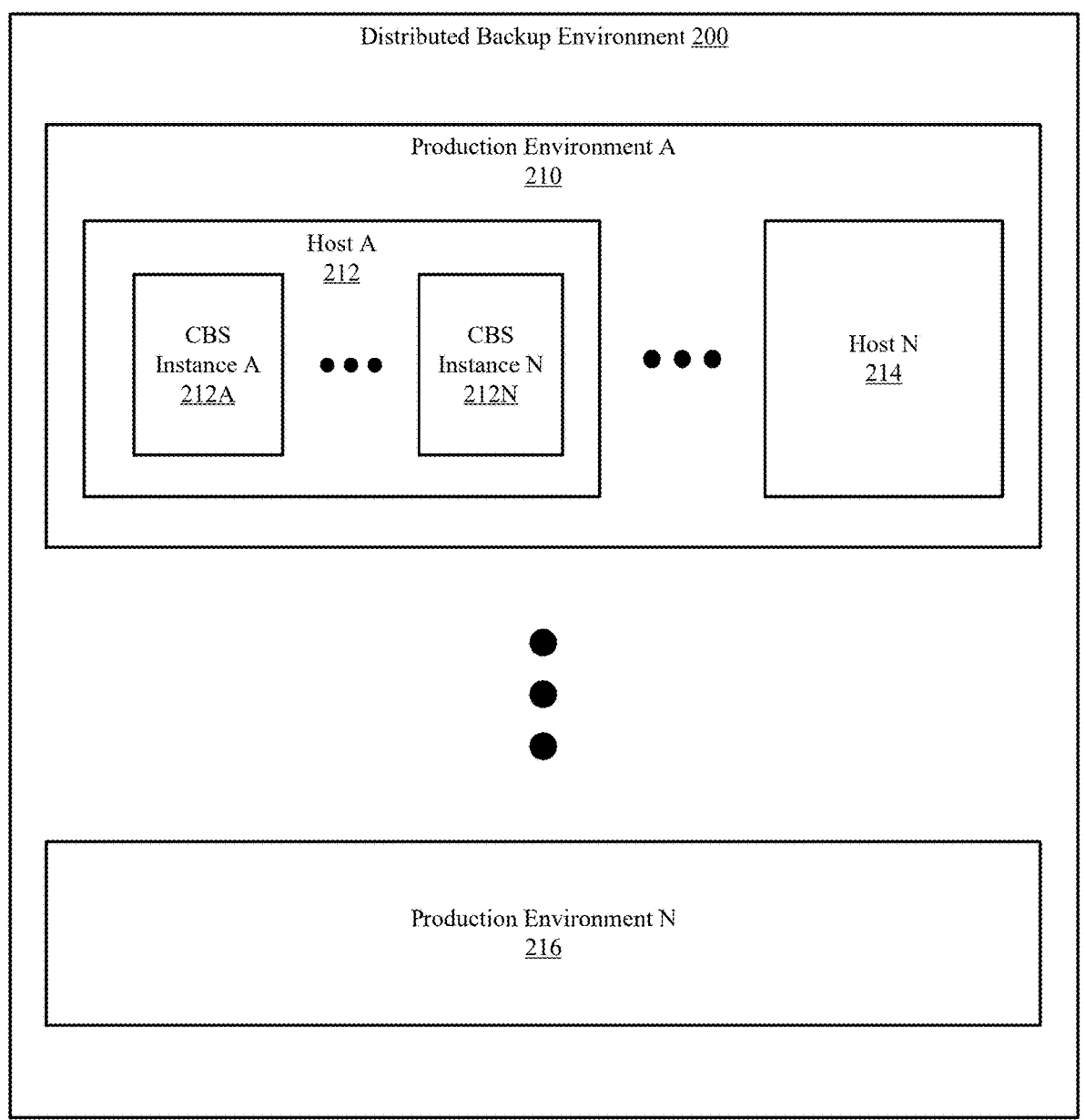
FIG. 2.1

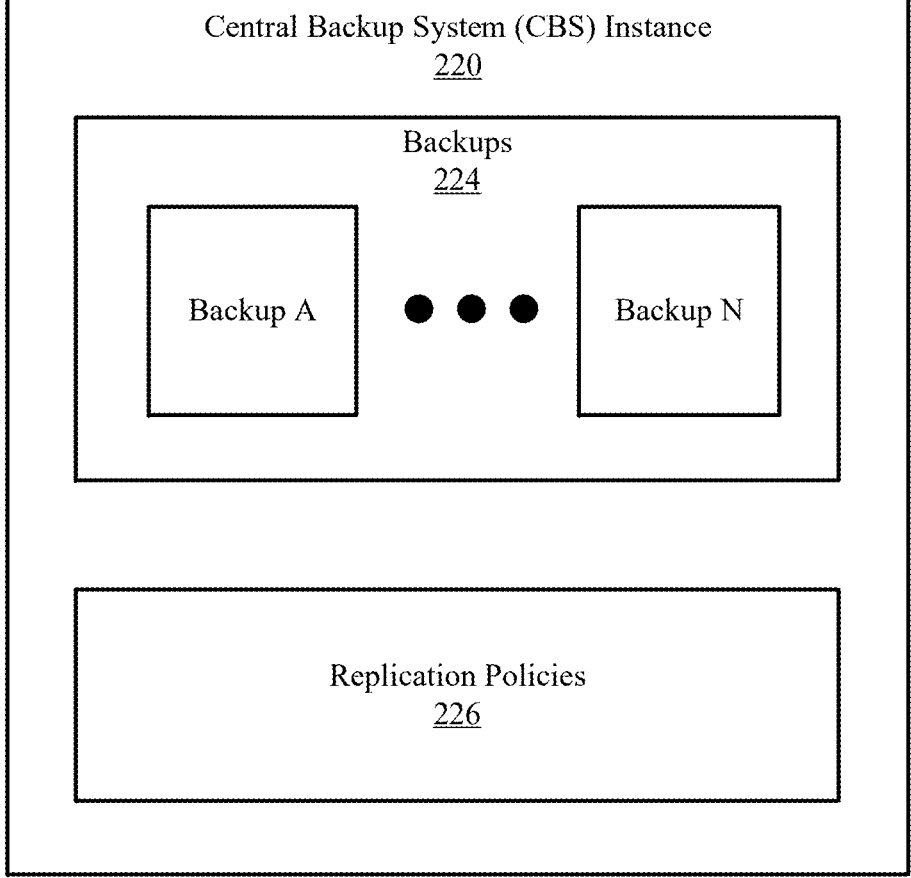
FIG. 2.2

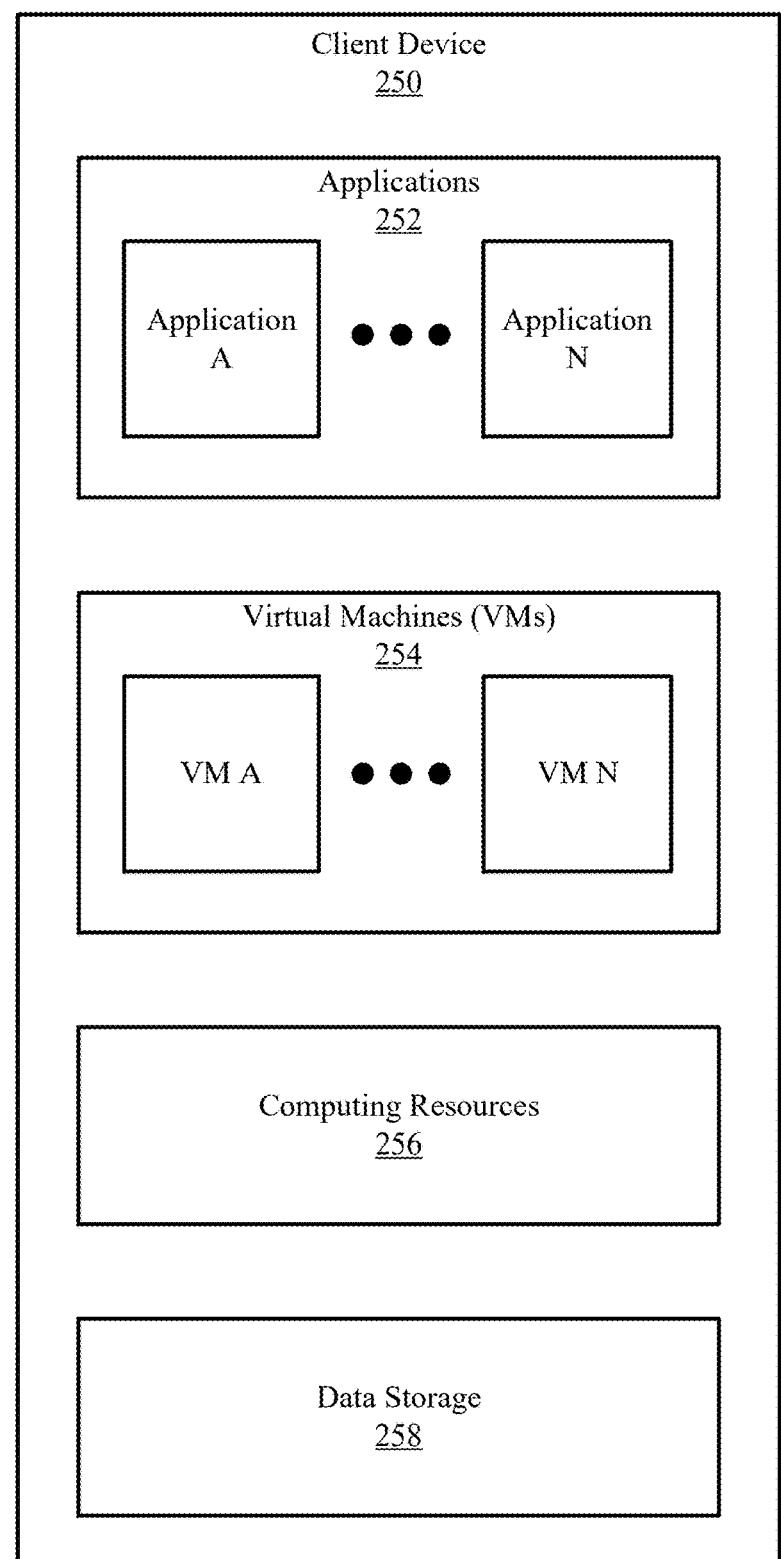
FIG. 2.3

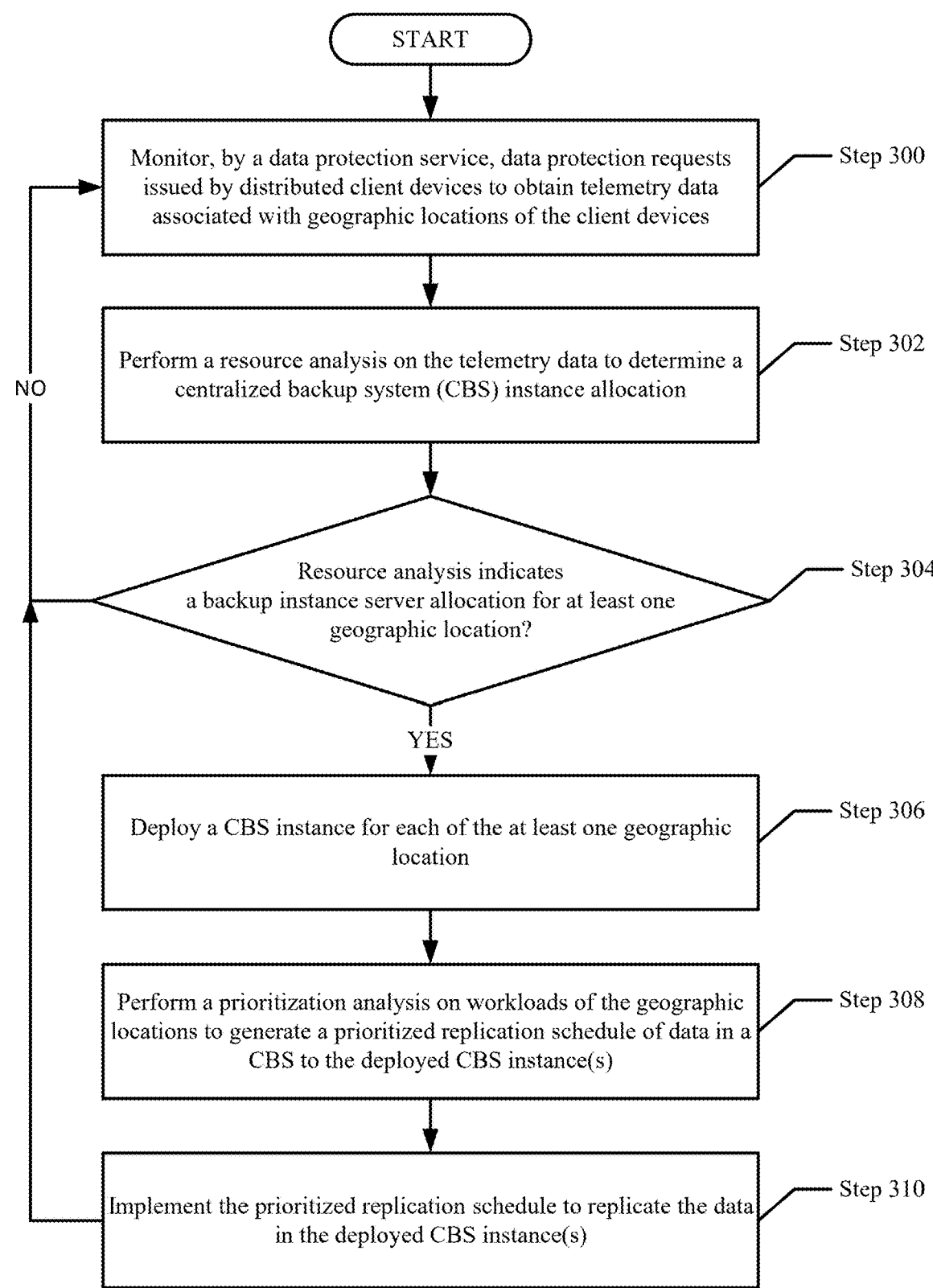
FIG. 3.1

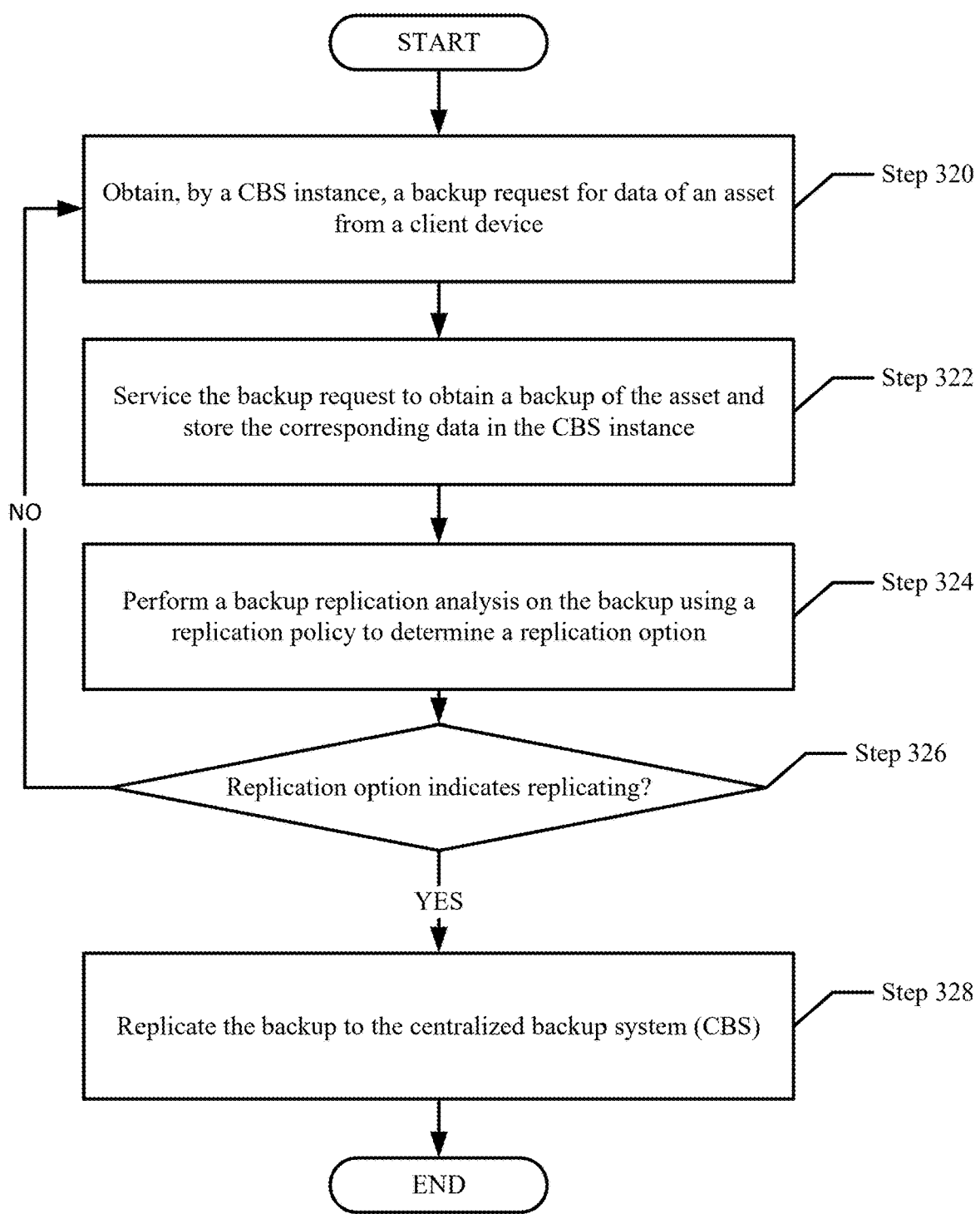
FIG. 3.2

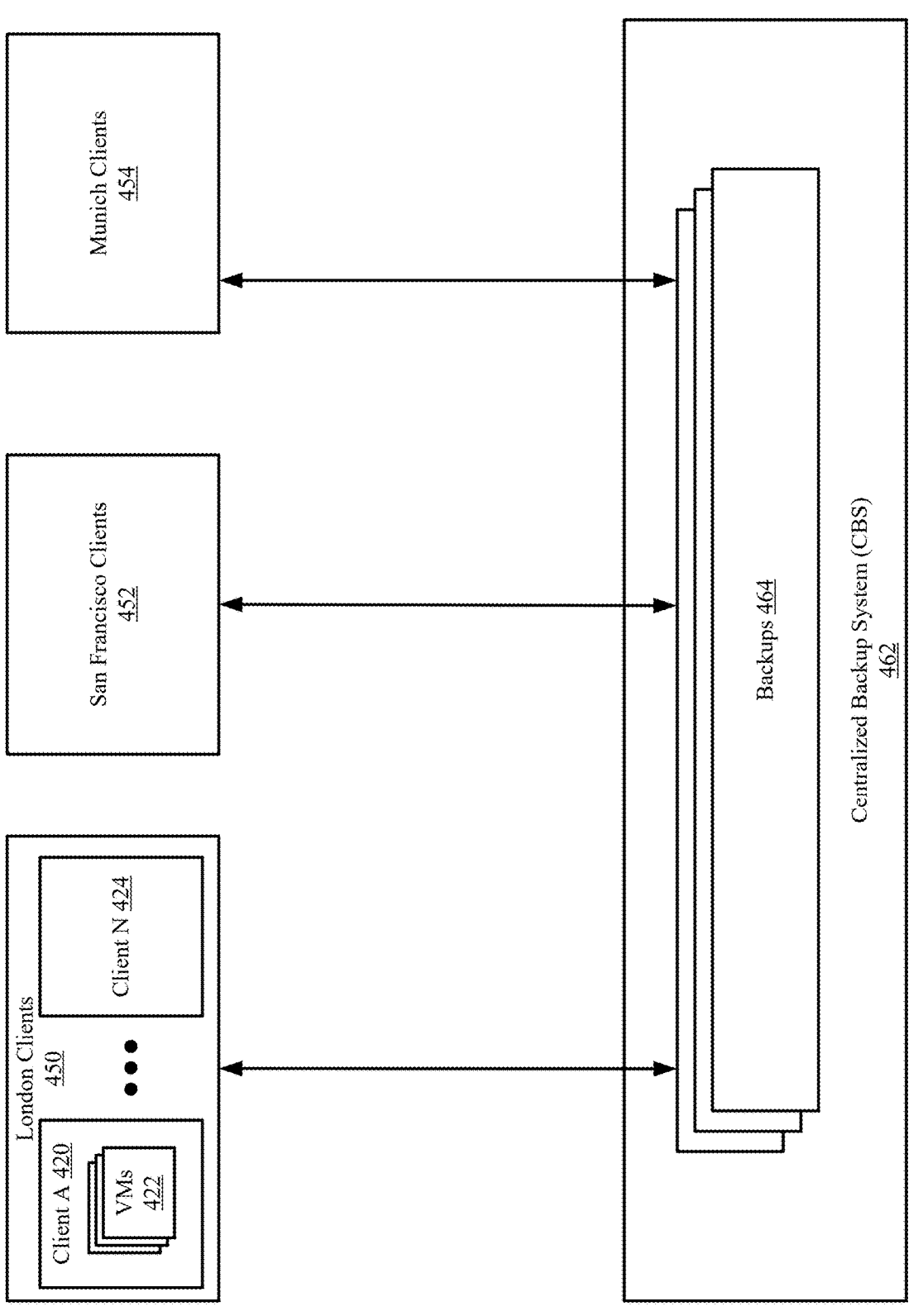
FIG. 4.1

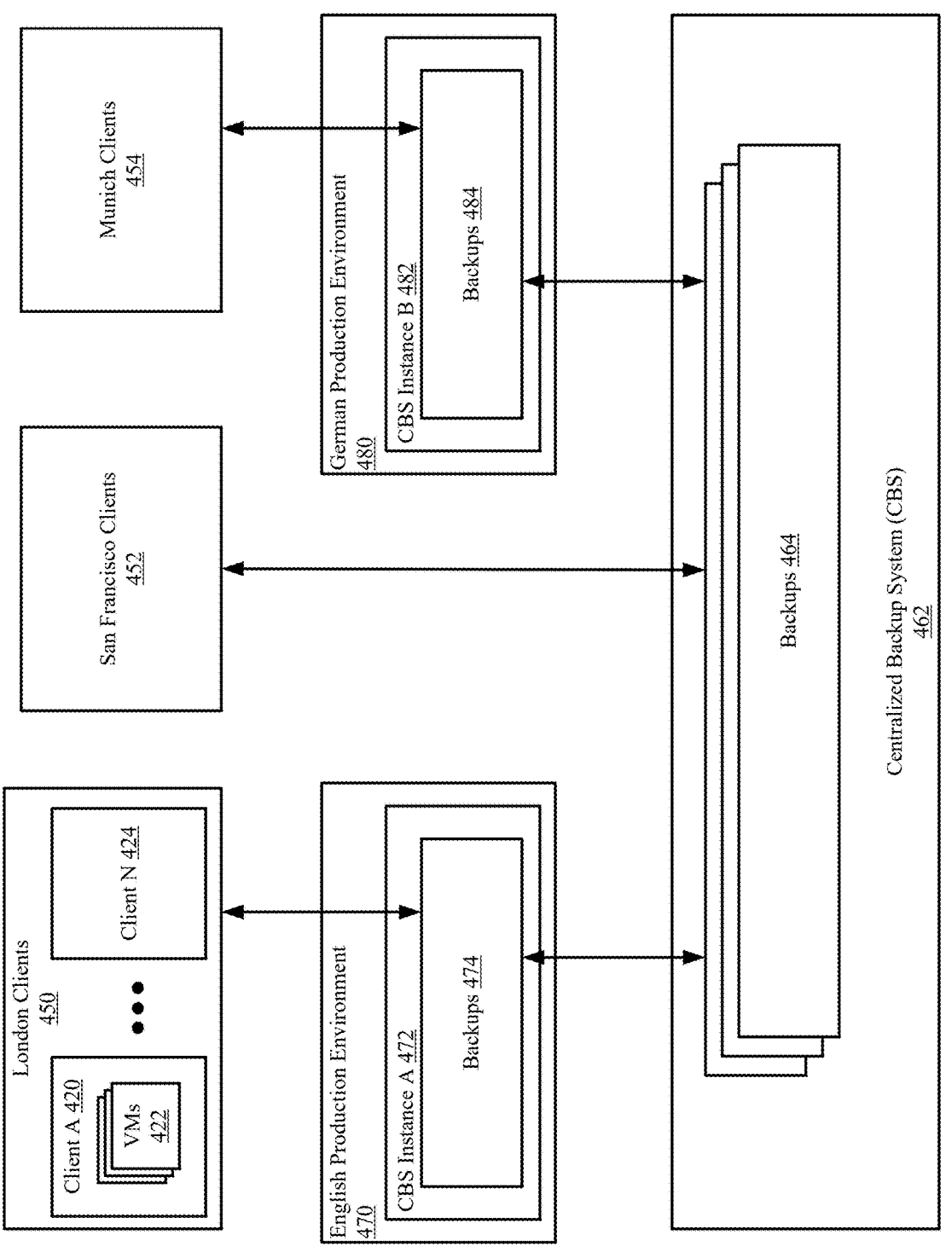
FIG. 4.2

GEOGRAPHICALLY DISPERSED BACKUP AND RECOVERY SYSTEM WITH DYNAMIC RESOURCE ALLOCATION AND LOAD BALANCING

BACKGROUND

Current computing devices may utilize traditional centralized backup systems for data protection services such as backups and recovery of app and virtual machine data. The centralized backup systems may be used for providing such services for clients located in geographically dispersed locations.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of a distributed backup environment in accordance with one or more embodiments of the invention.

FIG. 2.2 shows a diagram a central backup system (CBS) instance in accordance with one or more embodiments of the invention.

FIG. 2.3 shows a diagram of a client device in accordance with one or more embodiments of the invention.

FIG. 3.1 shows a flowchart of a method of instantiating a CBS instance in accordance with one or more embodiments of the invention.

FIG. 3.2 shows a flowchart of a method of instantiating a CBS instance in accordance with one or more embodiments of the invention.

FIGS. 4.1-4.2 show an example in accordance with one or more embodiments of the invention.

DETAILED DESCRIPTION

Figure 1:
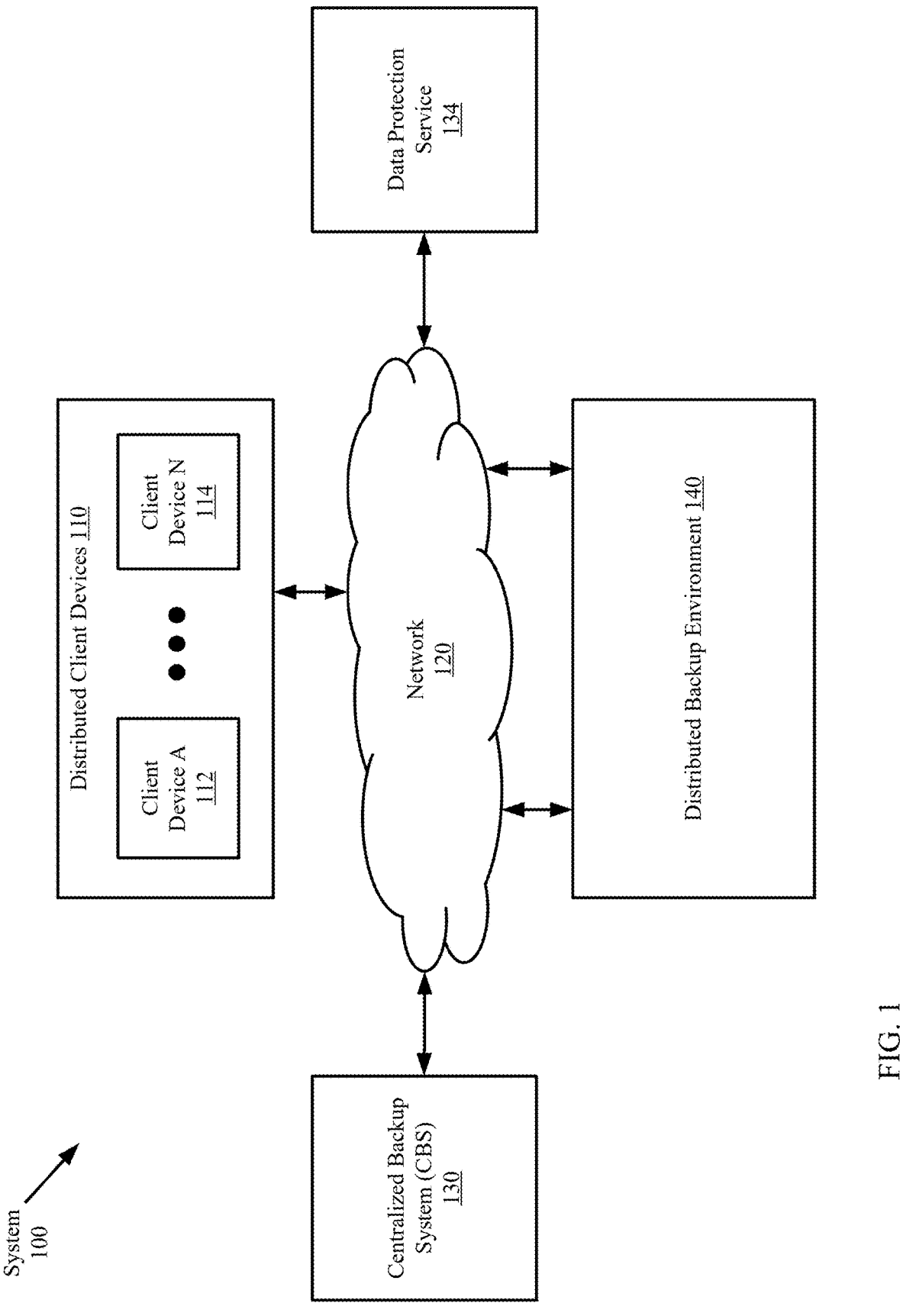
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein include methods and systems for managing data protection of application data. Specifically, client devices hosting the applications may utilize a centralized backup system (CBS) for data protection workloads such as backup and recovery of the application data. The client devices may be geographically dispersed across the world. As such, it may be more beneficial for the CBS (or instances therein) to be distributed relative to the geographical locations of the client devices. Embodiments disclosed herein include monitoring the data protection workloads provided by the CBS to determine whether to instantiate CBS instances in production environments located close to the client devices initiating such data protection workloads.

In one or more embodiments, a data protection service monitors the data protection workloads for client devices in a given geographic location, applies artificial intelligence (AI) logic to the monitored information to determine whether to deploy CBS instances in a production environment located in the given geographic location. Embodiments of the invention may further apply a replication analysis to determine how much of the backups in the CBS is to be replicated to the CBS instance to be used for restoration by the monitored client devices. Such monitoring may be performed for multiple geographic regions without departing from the invention. Backups generated by the CBS instances may be replicated to the CBS in accordance with replication policies implemented by the CBS instances.

In one or more embodiments, the data protection service includes functionality for powering down CBS instances based on monitored usage of the resources of the CBS instances. For example, for time periods determined to provide low volumes of workloads, the data protection service may power down the CBS instances, and any workloads initiated by client devices during the power-down may reroute their requests to the CBS.

The following describes various embodiments of the invention.

FIG. 1 shows a system in accordance with one or more embodiments of the invention. The system (100) includes any number of distributed client devices (110), a network (120), a centralized backup system (130), a data protection service (134), and a distributed backup environment (140). The system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments, the client devices (110) host applications, virtual machines, and/or other logical components that may generate or utilize data. The client devices (110) may initiate data protection requests for backup or recovery workloads. In one or more embodiments, the data protection requests are sent to the centralized backup system (CBS). Alternatively, the data protection request may be sent to CBS instances (discussed in FIG. 2.1) hosted by the distributed backup environment (140).

In one or more embodiments, each of the client devices (112, 114) is located in a geographic location. The geographic locations of each client devices (112, 114) may be distributed across the world, such that client device A (112) may be in a different or identical geographic region as client device N (114).

Figure 5:
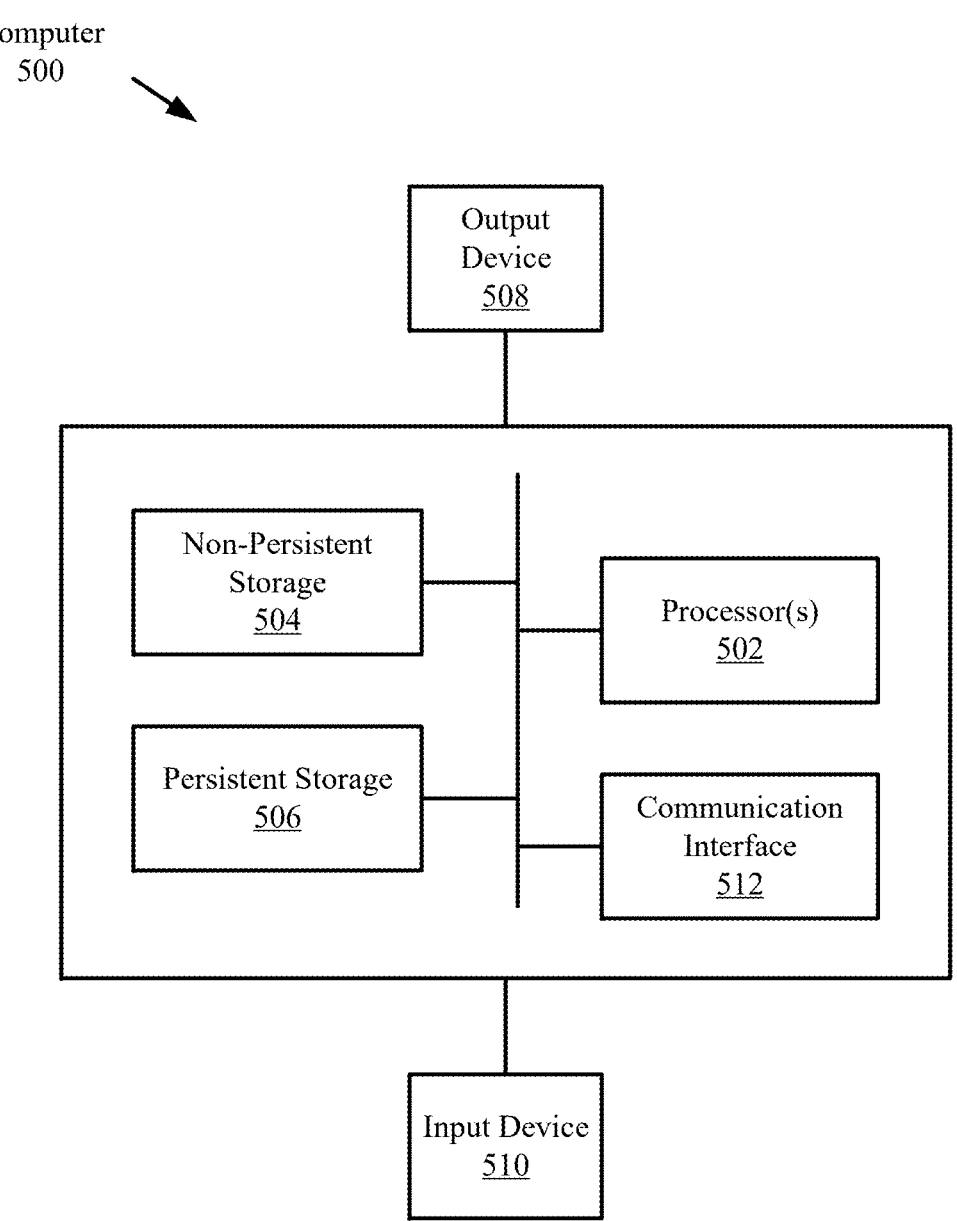
FIG. 5 shows a diagram of a computing device in accordance with one or more embodiments of the invention.

In one or more embodiments of the invention, each client (112, 114) is implemented as a computing device (e.g., 500, FIG. 5). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the client device (112, 114) described throughout this present disclosure.

Alternatively, in one or more embodiments of the invention, each client device (112, 114) implemented as logical devices. A logical device may utilize the computing resources of any number of computing devices to provide the functionality of the client devices (112, 114) described throughout this present disclosure.

For additional details regarding a client device (112, 114), refer to FIG. 2.3.

In one or more embodiments, the CBS (130) provides data protection workloads to the client devices (110). To provide such data protection workloads, the CBS (130) stores backups (not shown) in accordance with backup requests initiated by the client devices (110). The backups may be provided to the client devices (110) in accordance with recovery requests for the backups.

In one or more embodiments of the invention, the CBS (130) (and/or any components within) may be implemented as one or more computing devices (e.g., 500, FIG. 5). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the CBS (130) (and/or any components illustrated within) described throughout this present disclosure.

Alternatively, in one or more embodiments of the invention, the CBS (130) (and/or any components illustrated within) may be implemented as logical devices. A logical device may utilize the computing resources of any number of computing devices to provide the functionality of the CBS (130) (and/or any components illustrated within) described throughout this present disclosure.

The CBS (130) may be in a different geographic location from at least one of the dispersed client devices (110). In such scenarios, it may be beneficial for the CBS (130) to deploy CBS instances in locations more proximate to the at least one client device. In one or more embodiments, the CBS (130) utilizes a data protection service (134) to manage the deployment and/or powering down of CBS instances executed on the distributed backup environment (140). The data protection service (134) may include functionality to perform the method of FIG. 3.1 to monitor the workloads initiated by the distributed client devices (110) and based on the monitoring, determine whether to deploy the CBS instances (discussed in FIGS. 2.2 and 2.3) and/or replicate backups from the CBS (130) to the deployed CBS instances. Further, the data protection service (134) may include functionality for powering down the deployed CBS instances based on the monitored workloads. For example, for scenarios in which the CBS instance is predicted to be used infrequently for a given period of time, the data protection service (134) may decommission the CBS instance for the given period of time.

In one or more embodiments of the invention, the data protection service (134) (and/or any components within) may be implemented as one or more computing devices (e.g., 500, FIG. 5). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the data protection service (134) (and/or any components within) described throughout this present disclosure including, for example, the method illustrated in FIG. 3.1.

Alternatively, in one or more embodiments of the invention, the data protection service (134) (and/or any components within) may be implemented as logical devices. A logical device may utilize the computing resources of any number of computing devices to provide the functionality of the data protection service (134) (and/or any components illustrated within) described throughout this present disclosure including, for example, the method illustrated in FIG. 3.1.

While the data protection service (134) is illustrated in FIG. 1 as a separate entity, the data protection service may be implemented as a component of the CBS (130) without departing from the invention.

In one or more embodiments, the distributed backup environment (140) includes functionality for hosting any number of CBS instances as deployed by the data protection service (134). The distributed backup environment (140) may include any number of production environments (discussed in FIG. 2.1), each geographically dispersed. In one or more embodiments, each production environment of the distributed backup environment (140) may be geographically located relatively near at least one of the distributed client devices (112, 114) such that each deployed CBS instances of the distributed backup environment (140) may provide data protection workloads to the relatively near client devices (112, 114). For additional details regarding the CBS instances, the production environments, or the distributed backup environment (140), refer to FIG. 2.1.

In one or more embodiments of the invention, the above-mentioned system (100) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

FIG. 2.1 shows a diagram of a distributed backup environment in accordance with one or more embodiments. The distributed backup environment (200) may be an embodiment of the distributed backup environment (140, FIG. 4.1) discussed above. As discussed above, the distributed backup environment (200) may be used to provide backup and recovery services to a set of clients. To perform the aforementioned functionality, the distributed backup environment (200) may include any number of production environments (210, 216). Each production environment may include any number of hosts (212, 214). The distributed backup environment (200) may include additional, fewer, and/or different components without departing from the invention.

In one or more embodiments, the production environments (210) are each associated with a geographic region such as, for example, a country. For example, a first production environment (210) may be associated with the United States as a geographic region, and a second production environment (216) may be associated with Germany as a geographic region. In this example, the first production environment (210) may be used to service data protection requests to client devices (e.g., 110, FIG. 1) located in the United States, and the second production environment (216) may be used to service data protection requests to other client devices located in Germany.

In one or more embodiments, the hosts (212, 214) include functionality for providing resources to execute any number of CBS instances (212A, 212N). In one or more embodiments, each CBS instance (212A, 212N) provides identical services to the CBS (130, FIG. 1) discussed above. Given the geographic proximity of the hosts (212, 214) to the client devices being serviced, the CBS instances (212A, 212N) may be deployed by the data protection service (134, FIG. 1) in accordance with the method of FIG. 3.1.

For additional details regarding a CBS instance (212A, 212N), refer to FIG. 2.2.

In one or more embodiments of the invention, each host (212, 214) is implemented as a computing device (e.g., 500, FIG. 5). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the host (212, 214) described throughout this present disclosure.

Alternatively, in one or more embodiments of the invention, each host (212, 214) implemented as logical devices. A logical device may utilize the computing resources of any number of computing devices to provide the functionality of the host (212, 214) described throughout this present disclosure.

FIG. 2.2 shows a diagram of a CBS instance in accordance with one or more embodiments. The CBS instance (220) may be an embodiment of a CBS instance (212A, 212N, FIG. 2.1) discussed above. As discussed above, the CBS instance (220) may provide backup and recovery services to a set of clients. To perform the aforementioned functionality, the CBS instance (220) may include any number of backups (224) and any number of replication policies (226). The CBS instance (220) may include additional, fewer, and/or different components without departing from the invention.

In one or more embodiments, at least a portion of the backups (224) are replicated copies of backups obtained from the CBS (130, FIG. 1). In one or more embodiments, another portion of the backups (224) may be initiated by the client devices and generated by the CBS instance (220) in accordance with data protection requests such as backup requests.

The backups (224) may be replicated to the CBS (130, FIG. 1) in accordance with replication policies (226). The replication policies (226) may specify conditions for replicating each of the backups (224) to the CBS. Such conditions may include, for example, a time elapsed after generation of a backup, a criticality determined for the backup, and available bandwidth of the CBS instance (220) for transmitting replicated data to the CBS. Other conditions may be specified in the replication policies without departing from the invention. The implementation of the replication policies (226) by the CBS instance (220) may be performed in accordance with, for example, the method of FIG. 3.2.

FIG. 2.3 shows a diagram of a client device in accordance with one or more embodiments. The client device (250) may be an embodiment of a client device (112, 114, FIG. 1) discussed above. As discussed above, the client device (250) may utilize backup and recovery services provided by the distributed backup environment or a CBS. The client device (250) may include any number of applications (252), any number of virtual machines (VMs) (254), computing resources (256) that enable the client device (250) to execute the applications (252) and VMs (254), and data storage (258) that may store, for example, data backed up by the CBS or CBS instance. The client device (250) may include additional, fewer, and/or different components without departing from the invention.

FIG. 3.1 shows a flowchart of a method of instantiating a CBS instance in accordance with one or more embodiments of the invention. The method shown in FIG. 3.1 may be performed by, for example, a data protection service (e.g., 134, FIG. 1). Other components of the system in FIGS. 1-2.3 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

Turning to FIG. 3.1, in step 300, data protection requests issued by distributed client devices are monitored to obtain telemetry data associated with geographic locations of the client devices. In one or more embodiments, the telemetry data may specify a volume of data protection requests issued by the distributed client devices, a geographic location of each client device issuing the data protection requests, a size of data requested for either backups or recoveries during a given period of time. The telemetry data may include other information without departing from the invention.

In step 302, a resource analysis is performed on the telemetry data to determine a centralized backup system (CBS) instance allocation. In one or more embodiments, the resource analysis includes determining whether a frequency of data protection requests issued by client devices of a given geographic location meet a predefined threshold. The resource analysis may further include identifying a criticality (e.g., a pre-defined importance) of the applications being backed up or recovered, a bandwidth of the connection between the client devices of a given geographic location and the CBS servicing the requests, and a resource availability of a production environment located in the given geographic location. The resource analysis may include using the aforementioned criticality, bandwidth, and resource availability associated with the given geographic location to determine a backup instance server allocation for deploying a CBS instance in the given geographic location. The resource analysis may be performed for client devices of one or more geographic regions. The backup instance server allocation discussed herein may be determined for each geographic location.

In one or more embodiments, the resource analysis includes applying an artificial intelligence (AI) logic to pre-defined parameters associated with the CBS, the production environments, and/or the client devices to make the determination about whether to perform the CBS instance allocation for a given geographic location.

The AI logic may include defining the following expression to define a deployment score: (w1*DUT+w2*LBP+w3*LBR+w4*RTF+w5*VUL+w6*Storage_Ratio+w7*Latency_Ratio)/(w1+w2+w3+w4+w5+w6+w7). In one or more embodiments, DUT refers to a data usage trend over time. The DUT may be, for example, a growth rate of data usage defined as a numerical value. In this example, a low DUT value may indicate a decline rate of data usage, where a high DUT value may indicate a growth rate of the data usage. The parameter of LBP may refer to a load balancing performance. The load balancing performance may include a server load of the CBS associated with data protection workloads initiated by a given geographic location, a network bandwidth between the CBS and client devices in the given geographic location, and input/output (I/O) operations of the storage devices (e.g., persistent storage or volatile storage). The parameter of LBR may be a load balancing reliability (e.g., server uptime, network stability, disk health) of the CBS for the set of clients. The parameter of RTF may refer to a recovery time objective (e.g., maximum allowed downtime or data loss for the set of clients). The parameter of VUL may refer to a vulnerability assessment value. The VUL value may be defined using an evaluation of the risk of data breach, malware infection, hardware failure, and/or other potential vulnerability metrics. The BS parameter may refer to the amount of backup storage space available for the CBS or of hosts executing CBS instances. The CDS parameter may refer to a value of the current data size being protected by the client devices. The DGF parameter may refer to a value describing an expected rate of data growth over a certain period of time. The BIL parameter may refer to a backup I/O latency from servicing data protection workloads. The DLT parameter refers to a desired latency threshold for data protection workloads. The storage ratio parameter may be using the following expression: BS/(CDS*(1+DGF)). The latency ratio parameter may be defined using the following expression: BIL/DLT. The SC parameter may refer to a server configuration of the CBS based on the data size and growth rate of the set of clients, existing server load of the set of clients, and other factors without departing from the invention. The DS parameter may refer to a data subset for that would be replicated to a deployed CBS instance. The DS parameter may be calculated based on the type of data (e.g., a backup of a VM or an application), its importance, a frequency of access, and other parameters. The SC and DS values may provide dynamic decision-making and intelligence in determining the CBS instance allocations. In the above expression, each of the weights are defined as w1-w9. The weights may be defined by an administrator of the CBS.

In one or more embodiments, the deployment score defined using the above expression may be compared to a deployment threshold. If the deployment score exceeds the deployment threshold, the CBS instance allocation may indicate allocating a backup instance server. A deployment score may be generated for client devices associated with each geographic location monitored by the data protection service. Each deployment score may be compared to the deployment threshold to make a determination of the CBS instance allocation (also referred to as a backup instance server allocation). The backup instance server allocation discussed herein may be determined for each geographic location.

In step 304, a determination is made about whether a resource analysis indicates a backup instance server allocation for at least one geographic location. If the resource analysis indicates an allocation, the method proceeds to step 306; otherwise, the method returns to step 300.

In step 306, a CBS instance is deployed for each of the at least one geographic location. In one or more embodiments, the deployment of the CBS instance includes identifying a production environment geographically located in the identified at least one geographic region and issuing a deployment request to a host of such production environment to reserve resources of a host of the production environment to execute the CBS instance. The deployment of a CBS instance may be repeated for each geographic region determined in step 304.

In step 308, a prioritization analysis on workloads of the geographic locations is performed to generate a prioritized replication schedule of data in a CBS to the deployed CBS instances. In one or more embodiments, the prioritization analysis includes identifying backups that are regularly generated or used for recovery. Further, the prioritization includes ordering the identified backups based on application criticality, data size of the backups, predefined ordering by the administrator of the CBS, and/or any other factors without departing from the invention. The prioritization analysis may be performed for each deployed CBS instance of step 306.

In step 310, the prioritized replication schedule is implemented to replicate the data in the deployed CBS instances. In one or more embodiments, implementing the prioritized replication schedule includes replicating backups from the CBS to the host executing the CBS instance in the order specified in the prioritized replication schedule and during the specified time periods. The replications may be performed for each deployed CBS instance of step 306.

The method may return to step 300 following the implementation of the prioritized replication schedule on each deployed CBS instance.

FIG. 3.2 shows a flowchart of a method of instantiating a CBS instance in accordance with one or more embodiments of the invention. The method shown in FIG. 3.2 may be performed by, for example, a CBS instance (e.g., 220, FIG. 2.2). Other components of the system in FIGS. 1-2.3 may perform all, or a portion, of the method of FIG. 3.2 without departing from the invention.

In step 320, a backup request for data of an asset is obtained from a client device. The backup request may specify backing up data for an application or a virtual machine hosted by the client device. The asset may include such data.

In step 322, the backup request is serviced to obtain and store a backup of the asset in the CBS instance. In one or more embodiments, the backup request is serviced by generating a copy of the data from the client device and storing the data as a backup in the host executing the CBS instance.

In step 324, a backup replication analysis is performed on the backup using a replication policy to determine a replication option. In one or more embodiments, the backup replication analysis includes analyzing the backup request, the resources of the CBS instance available (e.g., bandwidth from the CBS instance to the CBS) and other information to determine whether a replication option applies to the generated backup of step 322. The replication option may be an option to replicate the backup to the CBS for synchronization purposes. For example, the CBS may be used to restore the backup generated by the CBS.

In step 326, a determination is made about whether a replication option indicates replicating the backup. If the replication option indicates replicating, the method proceeds to step 328; otherwise, the method returns to step 320.

In step 328, the backup is replicated to the CBS.

While FIG. 3.2 is illustrated as a series of steps, any of the steps may be omitted, performed in a different order, additional steps may be included, and/or any or all of the steps may be performed in a parallel and/or partially overlapping manner without departing from the invention.

To further clarify embodiments of the invention described throughout this disclosure, a non-limiting example is provided in FIG. 4.

EXAMPLE

Consider a scenario in which an order processing system for a business processes fluctuating and/or seasonally-based order volumes tracked each week. The order volumes are tracked as historical time series datasets.

FIG. 4 shows an example system in accordance with one or more embodiments of the invention. For the sake of brevity, not all components of the example system are illustrated in FIG. 4.1. The example system includes a first set of clients (450) located in London, England, a second set of clients (452) located in San Francisco, United States, a third set of clients (454) located in Munich, Germany. As illustrated in at least the first set of clients (also referred to as London clients (450)), each set of clients (450, 452, 454) may include any number of client devices (e.g., 420, 424), each hosting any number of virtual machines (VMs) (422).

The three sets of clients (450, 452, 454) utilize the data protection workloads of a centralized backup system (CBS) (462). This utilization is illustrated in FIG. 4.1 using arrows. The CBS (462) includes functionality for generating backups (464) of the VMs (e.g., 422), storing the backups (464) in the CBS (462), and providing recovery of the backups (464) to the client devices (e.g., 420, 424). The CBS (462) includes backup servers hosted in computing devices located in Los Angeles, United States. In this example, each of the three sets of clients (450, 452, 454) initiates high volumes of data protection requests (e.g., backups and recovery).

Given the large geographic distances between the CBS (462) and the London clients (450) and the Munich clients (454), the servicing of the data protection requests incur high levels of latency and low bandwidth to transmit the data of the backups (464) across the large geographic distances. As such, it may be beneficial to deploy CBS instances more proximate to at least the London clients (450) and the Munich clients (454).

A data protection service (not illustrated) of the CBS (462) performs the method of FIG. 3.1 to determine which geographic regions (e.g., countries) of the sets of clients (450, 452, 454) are have CBS instances deployed to. The data protection service deploys the CBS instances in England and Germany. FIG. 4.2 shows the result of this deployment.

Turning to FIG. 4.2, FIG. 4.2 shows a second diagram of the example system. The example system further includes an English production environment (470) that includes hosts located in England. Further, the example system includes a German production environment (480) that includes hosts located in Germany. Based on the initiated by the data protection service, a CBS instance (472, 482) is executing on each of the production environments (470, 480). CBS instance A (472) executes in England, and CBS instance B (482) executes in Germany. The CBS instances (472, 482) replicate backups (464) from the CBS (462) to be stored in the respective CBS instances (472, 482). The replications may be based on the usage of each portion of backups (464) by the respective sets of clients (450, 452, 454). For example, the backups (474) replicated in the English production environment (470) is a portion of the backups (464) of the CBS (462) that are most associated with the London clients (450). Further, the backups (484) replicated in the German production environment (480) is a portion of the backups (464) of the CBS (462) that are most associated with the Munic clients (454).

Following the deployment, the London clients (450) initiate data protection workloads such as backing up and recovering data using CBS instance A (472), and the Munich clients (454) initiate data protection workloads using CBS instance B (482). Given the proximity between the geographic location of the San Francisco clients (452) and the CBS (462), the San Francisco clients (452) continues to initiate data protection workloads using the CBS (462).

Though not illustrated in FIGS. 4.1-4.2, the data protection service may further include functionality to power down the deployed CBS instances (470, 480) based on continued monitoring of the usage by the London and Munich clients (450, 454). In such scenarios, the data protection service powers down a CBS instance if the CBS instance is used below a pre-defined threshold.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for optimizing resource use for data protection services. Specifically, embodiments include managing the deployment of centralized backup systems based on the usage of the data protection workloads such as backup and recovery of applications in a given geographic region. The usage may influence the deployment of instances of the centralized backup system in the given geographic region such that: (i) more instances are deployed if the usage is high, thus providing resources for the data protection of assets to the clients in the geographic region, and (ii) powering down instances if the usage is below a given threshold.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing data protection, the method comprising:

monitoring, by a data protection service, data protection requests issued by a set of client devices to obtain telemetry data, wherein the set of client devices are associated with a geographic location;

performing a resource analysis on the telemetry data to determine a centralized backup system (CBS) instance allocation for a CBS instance in the geographic location, wherein performing the resource analysis comprises obtaining a deployment score using the telemetry data and identifying the deployment score being above a predefined threshold, wherein the deployment score is generated by applying a set of parameters, each expressed as numerical values, and a predefined set of weights to a function, and wherein the set of parameters comprises: a rate of data, a load balancing performance parameter, a load balancing reliability parameter, a vulnerability assessment value, a backup storage space parameter, and an expected rate of data growth, a current data size protected for the set of client devices, a frequency of access by each of the client devices, a recovery time objective, a backup input/output (I/O) latency parameter, a desired latency threshold parameter, a storage ratio parameter, a latency ratio parameter, a server configuration, and a data subset parameter;

making a determination, based on the resource analysis, that the CBS instance is to be instantiated in the geographic location;

based on the determination, deploying the CBS instance in a production environment located in the geographic location; and initiating a replication of backup data from a CBS to the CBS instance.

2. The method of claim 1, wherein the CBS is not located in the geographic location, and wherein the CBS instance is operatively connected to the CBS.

3. The method of claim 1, further comprising:

prior to initiating the replication:

performing a prioritization analysis on the workloads initiated by the set of client devices to generate a prioritized schedule, wherein the replication of the backup data comprises replicating a subset of data from the CBS to the CBS instance in accordance with the prioritization schedule.

4. The method of claim 1, further comprising:

after initiating the replication:

monitoring additional data protection requests issued by the set of client devices to obtain second telemetry data, wherein the additional data protection requests are serviced by the CBS instance;

performing the resource analysis on the second telemetry data;

making a second determination, based on the resource analysis on the second telemetry data, that a power-down schedule is to be applied on the CBS instance; and based on the second determination, initiating a power-down of the CBS instance in accordance with the power-down schedule.

5. The method of claim 1, further comprising:

monitoring second data protection requests issued by a second set of client devices to obtain second telemetry data, wherein the second set of client devices are associated with a second geographic location, and wherein the second data protection requests are serviced by the CBS;

performing the resource analysis on the second telemetry data to determine a CBS instance allocation for a second CBS instance in the second geographic location;

making a second determination, based on the resource analysis, that the second CBS instance is to be instantiated in the second geographic location;

based on the determination, deploying the second CBS instance in a second production environment located in the second geographic location; and initiating a replication of second backup data from the CBS to the CBS instance.

6. The method of claim 1, wherein the CBS instance services additional data protection requests from the set of client devices using the backup data, and wherein the additional data protection requests comprise at least one of: a backup request for backing up data of one of the set of client devices to be stored in the CBS instance and a restoration request for restoring the backup data to another of the set of client devices.

7. The method of claim 1, wherein the data protection service executes on the CBS.

8. A non-transitory computer readable medium comprising computer readable program code, which when executed by a computer processor enables the computer processor to perform a method for managing data protection, the method comprising:

monitoring, by a data protection service, data protection requests issued by a set of client devices to obtain telemetry data, wherein the set of client devices are associated with a geographic location;

performing a resource analysis on the telemetry data to determine a centralized backup system (CBS) instance allocation for a CBS instance in the geographic location, wherein performing the resource analysis comprises obtaining a deployment score using the telemetry data and identifying the deployment score being above a predefined threshold, and wherein the deployment score is generated by applying a set of parameters, each expressed as numerical values, and a predefined set of weights to a function, and wherein the set of parameters comprises: a rate of data usage, a load balancing performance parameter, a load balancing reliability parameter, a vulnerability assessment value, a backup storage space parameter, and an expected rate of data growth, a current data size protected for the set of client devices, a frequency of access by each of the client devices, a recovery time objective, a backup input/output (I/O) latency parameter, a desired latency threshold parameter, a storage ratio parameter, a latency ratio parameter, a server configuration, and a data subset parameter;

making a determination, based on the resource analysis, that the CBS instance is to be instantiated in the geographic location;

based on the determination, deploying the CBS instance in a production environment located in the geographic location; and initiating a replication of backup data from a CBS to the CBS instance.

9. The non-transitory computer readable medium of claim 8, wherein the CBS is not located in the geographic location and wherein the CBS instance is operatively connected to the CBS.

10. The non-transitory computer readable medium of claim 8, further comprising:

prior to initiating the replication:

performing a prioritization analysis on workloads initiated by the set of client devices to generate a prioritized schedule, wherein the replication of the backup data comprises replicating a subset of data from the CBS to the CBS instance in accordance with the prioritization schedule.

11. The non-transitory computer readable medium of claim 8, further comprising:

after initiating the replication:

monitoring additional data protection requests issued by the set of client devices to obtain second telemetry data, wherein the additional data protection requests are serviced by the CBS instance;

performing the resource analysis on the second telemetry data;

making a second determination, based on the resource analysis on the second telemetry data, that a power-down schedule is to be applied on the CBS instance; and based on the second determination, initiating a power-down of the CBS instance in accordance with the power-down schedule.

12. The non-transitory computer readable medium of claim 8, further comprising:

monitoring second data protection requests issued by a second set of client devices to obtain second telemetry data, wherein the second set of client devices are associated with a second geographic location, and wherein the second data protection requests are serviced by the CBS;

performing the resource analysis on the second telemetry data to determine a CBS instance allocation for a second CBS instance in the second geographic location;

making a second determination, based on the resource analysis, that the second CBS instance is to be instantiated in the second geographic location;

based on the determination, deploying the second CBS instance in a second production environment located in the second geographic location; and initiating a replication of second backup data from the CBS to the CBS instance.

13. The non-transitory computer readable medium of claim 8, wherein the CBS instance services additional data protection requests from the set of client devices using the backup data, and wherein the additional data protection requests comprise at least one of: a backup request for backing up data of one of the set of client devices to be stored in the CBS instance and a restoration request for restoring the backup data to another of the set of client devices.

14. The non-transitory computer readable medium of claim 8, wherein the data protection service executes on the CBS.

15. A system, comprising:

a centralized backup system (CBS) comprising a processor and a data protection service;

a set of client devices located in a geographic location; and a production environment located in the geographic location, wherein the data protection service is programmed to:

monitor data protection requests issued by the set of client devices to obtain telemetry data;

perform a resource analysis on the telemetry data to determine a centralized backup system (CBS) instance allocation for a CBS instance in the geographic location, wherein performing the resource analysis comprises obtaining a deployment score using the telemetry data and identifying the deployment score being above a predefined threshold, wherein the deployment score is generated by applying a set of parameters, each expressed as numerical values, and a predefined set of weights to a function, and wherein the set of parameters comprises: a rate of data usage, a load balancing performance parameter, a load balancing reliability parameter, a vulnerability assessment value, a backup storage space parameter, and an expected rate of data growth, a current data size protected for the set of client devices, a frequency of access by each of the client devices, a recovery time objective, a backup input/output (I/O) latency parameter, a desired latency threshold parameter, a storage ratio parameter, a latency ratio parameter, a server configuration, and a data subset parameter;

make a determination, based on the resource analysis, that the CBS instance is to be instantiated in the geographic location;

based on the determination, deploy the CBS instance in the production environment; and initiate a replication of backup data from the CBS to the CBS instance.

16. The system of claim 15, wherein the CBS is not located in the geographic location and wherein the CBS instance is operatively connected to the CBS.

17. The system of claim 15, wherein the data protection service is further programmed to:

prior to initiating the replication:

perform a prioritization analysis on workloads initiated by the set of client devices to generate a prioritized schedule, wherein the replication of the backup data comprises replicating a subset of data from the CBS to the CBS instance in accordance with the prioritization schedule.

18. The system of claim 15, wherein the data protection service is further programmed to:

after initiating the replication:

monitor additional data protection requests issued by the set of client devices to obtain second telemetry data, wherein the additional data protection requests are serviced by the CBS instance;

perform the resource analysis on the second telemetry data;

make a second determination, based on the resource analysis on the second telemetry data, that a power-down schedule is to be applied on the CBS instance; and based on the second determination, initiate a power-down of the CBS instance in accordance with the power-down schedule.

19. The system of claim 15, wherein the data protection service is further programmed to:

monitor second data protection requests issued by a second set of client devices to obtain second telemetry data, wherein the second set of client devices are associated with a second geographic location, and wherein the second data protection requests are serviced by the CBS;

perform the resource analysis on the second telemetry data to determine a CBS instance allocation for a second CBS instance in the second geographic location;

make a second determination, based on the resource analysis, that the second CBS instance is to be instantiated in the second geographic location;

based on the determination, deploying the second CBS instance in a second production environment located in the second geographic location; and initiate a replication of second backup data from the CBS to the CBS instance.

20. The system of claim 15, wherein the CBS instance services additional data protection requests from the set of client devices using the backup data, and wherein the additional data protection requests comprise at least one of: a backup request for backing up data of one of the set of client devices to be stored in the CBS instance and a restoration request for restoring the backup data to another of the set of client devices.

* * * * *